US007971198B2

(12) United States Patent
Almeida

(10) Patent No.: US 7,971,198 B2
(45) Date of Patent: Jun. 28, 2011

(54) METHOD FOR GLOBAL RESOURCE SHARING HAVING LOGICALLY LINKED MEANS AND INTEGRATED FUNCTIONALITY FOR BUILDING SOLUTIONS

(75) Inventor: John Almeida, Berkeley, CA (US)

(73) Assignee: UnoWeb Inc., Emeryville, CA (US)

( * ) Notice: Subject to any disclaimer, the term of this patent is extended or adjusted under 35 U.S.C. 154(b) by 1159 days.

(21) Appl. No.: 11/160,099

(22) Filed: Jun. 8, 2005

(65) Prior Publication Data
US 2006/0282837 A1    Dec. 14, 2006

(51) Int. Cl.
*G06F 9/44* (2006.01)
(52) U.S. Cl. ........ 717/164; 717/103; 717/107; 717/120; 707/954
(58) Field of Classification Search .................. 717/162
See application file for complete search history.

(56) References Cited

U.S. PATENT DOCUMENTS

| | | | | |
|---|---|---|---|---|
| 5,159,687 A * | 10/1992 | Richburg | | 717/106 |
| 5,421,012 A * | 5/1995 | Khoyi et al. | | 718/107 |
| 5,634,095 A * | 5/1997 | Wang et al. | | 715/763 |
| 5,890,175 A | 3/1999 | Wong et al. | | |
| 5,903,859 A * | 5/1999 | Stone et al. | | 704/8 |
| 5,999,915 A | 12/1999 | Nahan et al. | | |
| 6,018,742 A | 1/2000 | Herbert, III | | |
| 6,028,940 A | 2/2000 | Tanaka et al. | | |
| 6,028,997 A * | 2/2000 | Leymann et al. | | 717/104 |
| 6,029,141 A | 2/2000 | Bezzos et al. | | |
| 6,141,666 A | 10/2000 | Tobin | | |
| 6,233,726 B1 * | 5/2001 | Bowman et al. | | 717/107 |
| 6,249,772 B1 | 6/2001 | Walker et al. | | |
| 6,374,400 B1 * | 4/2002 | Pickett | | 717/162 |
| 6,493,661 B1 | 12/2002 | White, III et al. | | |
| 6,513,153 B1 | 1/2003 | Lee | | |
| 6,556,975 B1 | 4/2003 | Wittsche | | |
| 6,601,043 B1 | 7/2003 | Purcell | | |
| 6,658,571 B1 * | 12/2003 | O'Brien et al. | | 726/26 |
| 6,901,376 B1 | 5/2005 | Sculler et al. | | |
| 6,901,378 B1 | 5/2005 | Linker et al. | | |
| 6,907,401 B1 | 6/2005 | Vittal et al. | | |
| 7,007,076 B1 | 2/2006 | Hess et al. | | |
| 7,013,289 B2 | 3/2006 | Horn et al. | | |

(Continued)

OTHER PUBLICATIONS

An Architecture Model for Dynamically Converting Components into Web Services Roger Lee, Haeng-Kon Kim, Haeng-Kon Kim Proceedings of the 11th Asia-Pacific Software Engineering Conference (APSEC'04) Year of Publication: 2004.*

(Continued)

*Primary Examiner* — Emerson C Puente
*Assistant Examiner* — Paul Mills
(74) *Attorney, Agent, or Firm* — Louis Ventre, Jr.

(57) ABSTRACT

A resources sharing container having logic-linking mechanism for logically linking program code to pages, pages to applications and applications to solutions. The resources sharing container will have the ability to create finished solutions by using its logic functionalities (logic-linking, resources code, enhancements, etc.), application requirements (application pages and their programming code logic) and preconfigured enhancements (settings, translations, interfacing, securities, etc.), and have the final solution tailored to each user's prerequisites. Moreover, it will permit the creation of a global resource sharing of logically linked software code blocks, application pages and application page's settings that can be shared in house, over a network or globally over the Internet, thus, reducing replication and distribution costs, since all the developments, securities and enhancements are at the resources level at a single location.

6 Claims, 18 Drawing Sheets

U.S. PATENT DOCUMENTS

| | | |
|---|---|---|
| 7,080,089 B2 | 7/2006 | Plaisted et al. |
| 7,162,723 B2 | 1/2007 | Gouthrie et al. |
| 7,318,216 B2 * | 1/2008 | Diab ............................ 717/108 |
| 7,321,917 B2 * | 1/2008 | Durham ........................ 709/203 |
| 7,415,704 B2 | 8/2008 | Schmidt et al. |
| 7,415,709 B2 | 8/2008 | Hip et al. |
| 7,546,576 B2 * | 6/2009 | Egli ............................. 717/106 |
| 7,574,381 B1 | 8/2009 | Lin-Hendel |
| 7,587,721 B2 | 9/2009 | Schmidt et al. |
| 2001/0007979 A1 | 7/2001 | Teshima |
| 2001/0056377 A1 | 12/2001 | Kondoh et al. |
| 2002/0049961 A1 * | 4/2002 | Fang et al. .................... 717/127 |
| 2002/0113809 A1 | 8/2002 | Akazawa et al. |
| 2002/0152131 A1 | 10/2002 | Lee |
| 2002/0178271 A1 | 11/2002 | Graham et al. |
| 2002/0184104 A1 | 12/2002 | Littman |
| 2003/0004746 A1 * | 1/2003 | Kheirolomoom et al. ........ 705/1 |
| 2003/0074634 A1 * | 4/2003 | Emmelmann ................. 715/513 |
| 2003/0093433 A1 | 5/2003 | Seaman et al. |
| 2003/0120560 A1 | 6/2003 | Almeida |
| 2003/0154135 A1 | 8/2003 | Covington et al. |
| 2004/0143822 A1 * | 7/2004 | Jager et al. .................... 717/140 |
| 2004/0181464 A1 | 9/2004 | Vanker et al. |
| 2004/0205690 A1 * | 10/2004 | Pieper ........................... 717/100 |
| 2004/0216132 A1 | 10/2004 | Messec et al. |
| 2004/0237064 A1 | 11/2004 | Liu et al. |
| 2005/0015303 A1 | 1/2005 | Dubin et al. |
| 2005/0198647 A1 | 9/2005 | Hip et al. |
| 2005/0204357 A1 | 9/2005 | Garg et al. |
| 2005/0262181 A1 | 11/2005 | Schmidt et al. |
| 2005/0278617 A1 * | 12/2005 | Martell et al. ................ 715/513 |
| 2006/0011720 A1 | 1/2006 | Call |
| 2006/0080640 A1 * | 4/2006 | Cheng et al. .................. 717/120 |
| 2007/0174414 A1 | 7/2007 | Song et al. |
| 2008/0052615 A1 | 2/2008 | Almeida |
| 2010/0005009 A1 | 1/2010 | Lin-Hendel |

OTHER PUBLICATIONS

Rick Greenwald, et al, "Oracle Essentials: Oracle9i, Oracle8i and Oracle8, Second Edition", O'Reilly Media, Inc., Jun. 12, 2001, chapter 14, cited in office action dated Dec. 22, 2010 on applicant's co-pending U.S. Appl. No. 11/932,774.

* cited by examiner

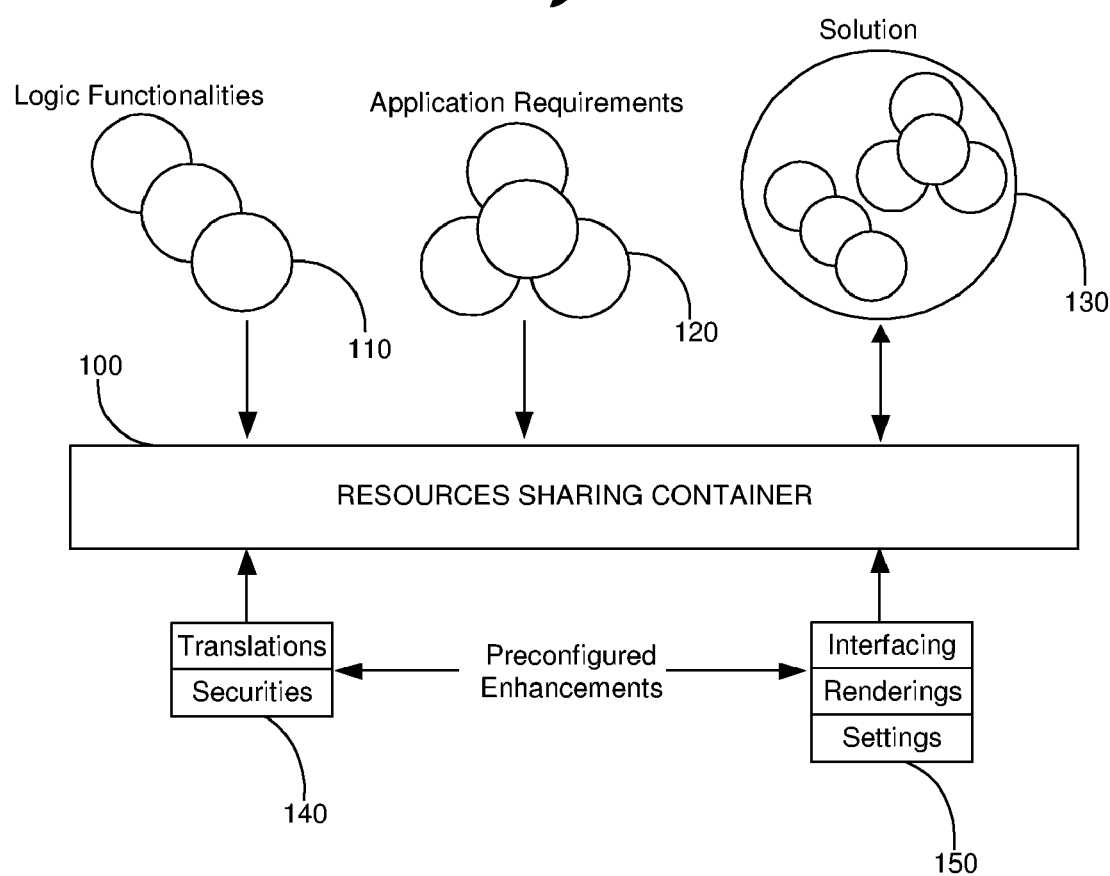

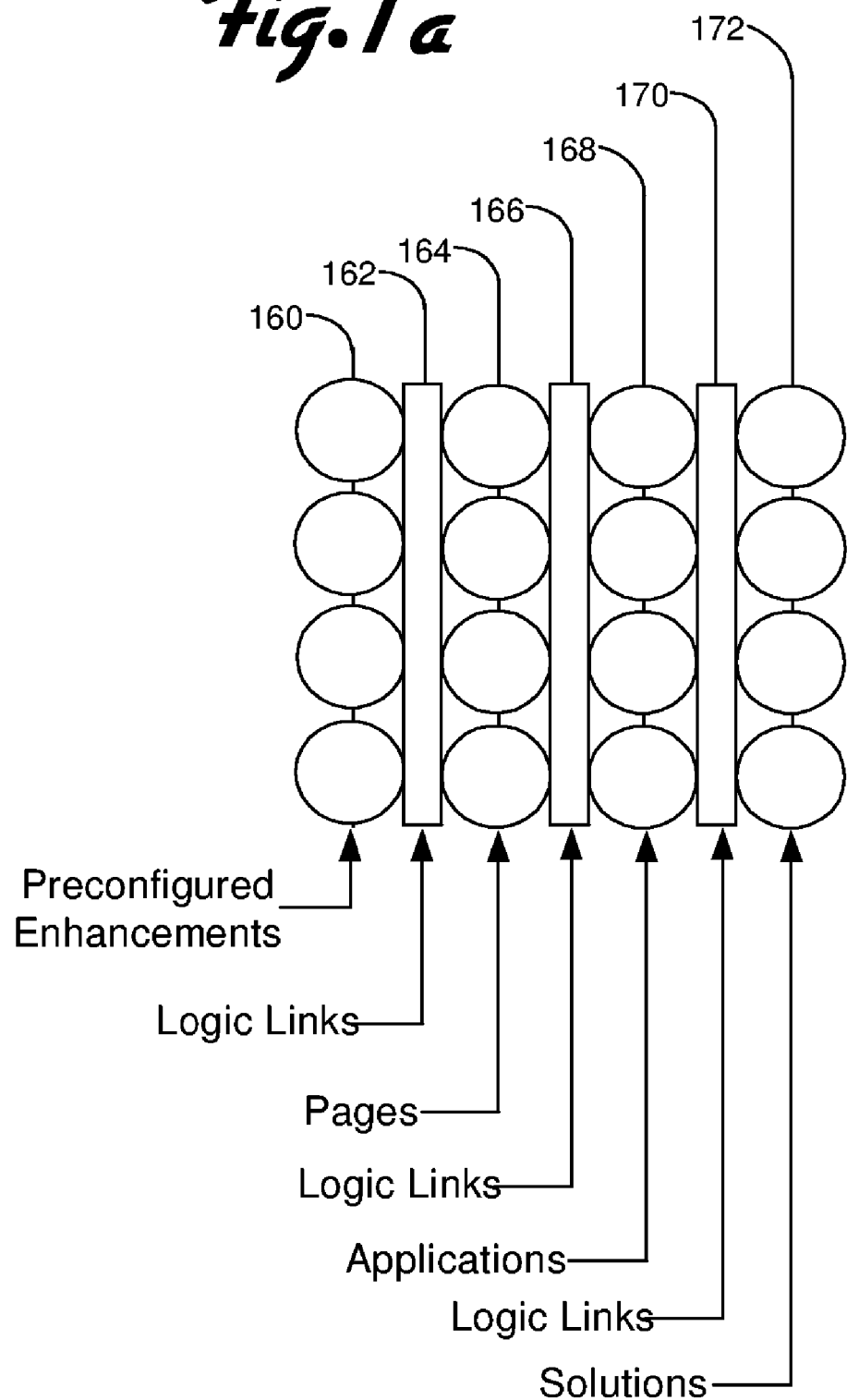

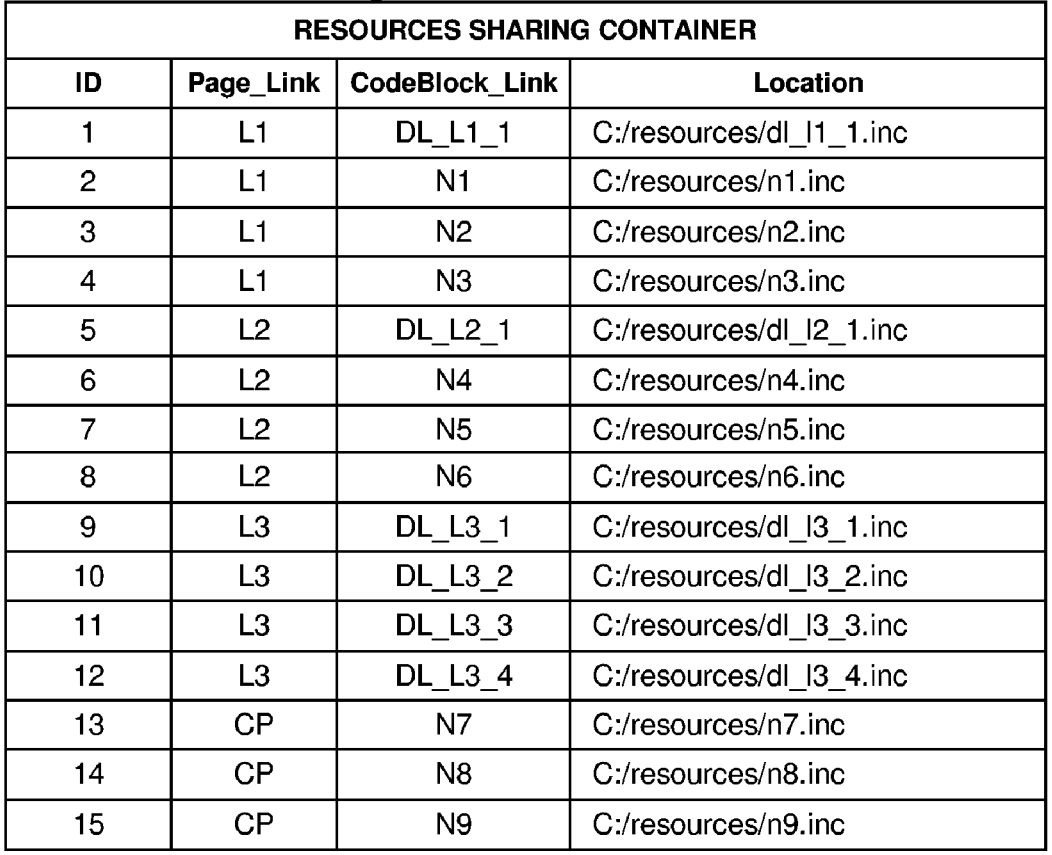

Fig. 6

| RESOURCES SHARING CONTAINER | | | |
|---|---|---|---|
| ID | Page_Link | CodeBlock_Link | Location |
| 1 | L1 | DL_L1_1 | C:/resources/dl_l1_1.inc |
| 2 | L1 | N1 | C:/resources/n1.inc |
| 3 | L1 | N2 | C:/resources/n2.inc |
| 4 | L1 | N3 | C:/resources/n3.inc |
| 5 | L2 | DL_L2_1 | C:/resources/dl_l2_1.inc |
| 6 | L2 | N4 | C:/resources/n4.inc |
| 7 | L2 | N5 | C:/resources/n5.inc |
| 8 | L2 | N6 | C:/resources/n6.inc |
| 9 | L3 | DL_L3_1 | C:/resources/dl_l3_1.inc |
| 10 | L3 | DL_L3_2 | C:/resources/dl_l3_2.inc |
| 11 | L3 | DL_L3_3 | C:/resources/dl_l3_3.inc |
| 12 | L3 | DL_L3_4 | C:/resources/dl_l3_4.inc |
| 13 | CP | N7 | C:/resources/n7.inc |
| 14 | CP | N8 | C:/resources/n8.inc |
| 15 | CP | N9 | C:/resources/n9.inc |

*Fig.* 7    700

```
function firstPage()
{
        if(getResources("N1"))
        {
            //code to be executed it can be include files
            //with code to be processed or DLL's.
        }
        if(getResources("N2"))
        {
            //code to be executed it can be include files
            //with code to be processed or DLL's.
        }
        if(getResources("N3"))
        {
            //code to be executed it can be include files
            //with code to be processed or DLL's.
        }
} function getResources(sParm)
{
        if(checkResources(sParm))
        {
                return(true);
        }
        return(false);
} function checkResources(sParm)
{
        //compare "sParm" with user selected logic code block and return
        //"true" if the resources has been selected by the user otherwise
        //return "false" code not shown for sake of simplicity.
}
```

Fig. 12

| | RESOURCES TABLE | | | |
|---|---|---|---|---|
| ID | Application_ID | Interfacing | Settings | Code_Logic |
| 1 | FirstApp | N7 | CanvasBGColor=Blue; TextColor=White | PLNOdes=N4;N6 \|PLLinks=L2;L3 |
| 2 | SecondApp | N8 | CanvasBGColor=Yellow; TextColor=Black | PLNOdes=N6 \|PLLinks=L2;L3 |
| 3 | ThirdApp | N9 | | PLNOdes=N1;N5 \|PLLinks=L1;L2 |
| 4 | GlobalSol | N9 | | PLNOdes=N1;N2 \|PLLinks=L1 |

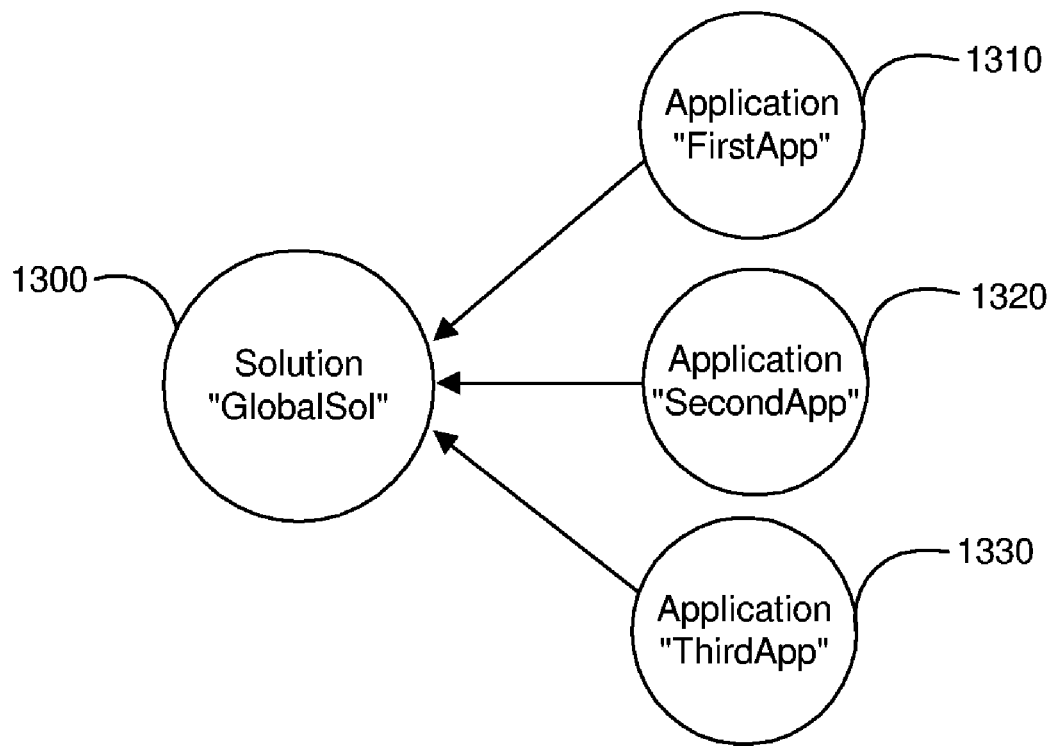

| Solution_ID | Application_ID |
|---|---|
| GlobalSol | FirstApp |
| GlobalSol | SecondApp |
| GlobalSol | ThirdApp |
| GlobalSolX | FirstApp |
| GlobalSolY | ThirdApp |

Fig.18

| User_ID | Solution_ID | Application_ID | Type |
|---|---|---|---|
| User_A | GlobalSol | FirstApp | Application |
| User_A | GlobalSol | SecondApp | Application |
| User_A | GlobalSol | ThirdApp | Application |
| User_A | GlobalSol | GlobalSol | Solution |
| User_B | GlobalSol | FirstApp | Application |
| User_B | GlobalSol | SecondApp | Application |
| User_B | GlobalSol | ThirdApp | Application |
| User_B | GlobalSol | GlobalSol | Solution |

APPLICATION_ID=FirstApp:USER_ID=User_A

| | |
|---|---|
| PLNodes | = N4;N6 |
| PLLinks | = L2; L3 |
| Pages | = Second Page\|C:/resources/second_page.asp; Third Page\|C:/resources/third_page.asp |
| InterfaceNode | = N7 |
| CanvasBGColor | = Blue |
| TextColor | = White |
| Type | = Application |

Fig. 22

APPLICATION_ID=SecondApp:USER_ID=User_A

| | |
|---|---|
| PLNodes | = N6 |
| PLLinks | = L2; L3 |
| Pages | = Second Page\|C:/resources/second_page.asp; Third Page\|C:/resources/third_page.asp |
| InterfaceNode | = N8 |
| CanvasBGColor | = Yellow |
| TextColor | = Black |
| Type | = Application |

Fig. 23

APPLICATION_ID=ThirdApp:USER_ID=User_A

| | |
|---|---|
| PLNodes | = N1; N5 |
| PLLinks | = L1; L2; L3 |
| Pages | = First Page\|C:/resources/first_page.asp; Second Page\|C:/resources/second_page.asp; Third Page\|C:/resources/third_page.asp |
| InterfaceNode | = N9 |
| Type | = Application |

Fig. 24

SOLUTION_ID=GlobalSol:USER_ID=User_A

| | |
|---|---|
| PLNodes | = N1; N2 |
| PLLinks | = L1 |
| Pages | = First Page\|C:/resources/first_page.asp |
| IntefaceNode | = N9 |
| Type | = Solution |
| Applications | = FirstApp; SecondApp; ThirdApp |

```
<table>
    <tr>
        <td>
            <%=getResources("N1")%>
        </td>
    </tr>
</table>
```

```
<table bgcolor='<%=getSettings("canvasBGColor")%>'>
    <tr>
        <td>
            <%=getResources("N1")%>
        </td>
    </tr>
</table>
```

Fig. 27
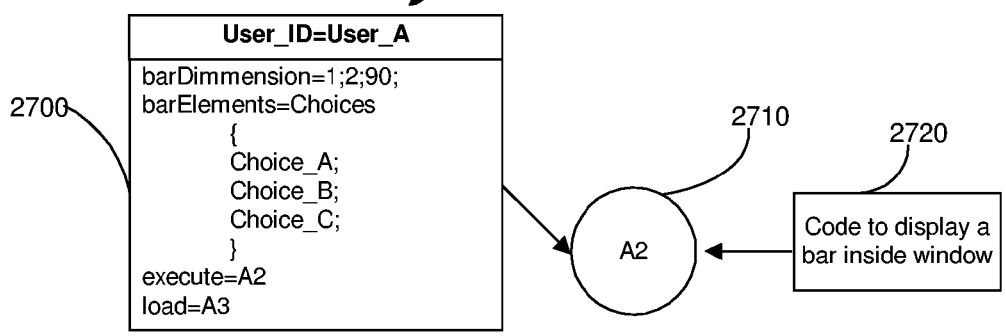
Fig. 28
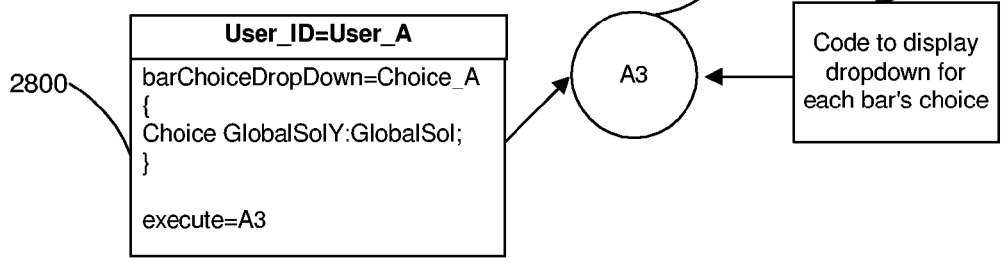
Fig. 29
http://www.mysite.com/resources.asp?USER_ID=User_A&SOLUTION_ID=GolobalSol

METHOD FOR GLOBAL RESOURCE SHARING HAVING LOGICALLY LINKED MEANS AND INTEGRATED FUNCTIONALITY FOR BUILDING SOLUTIONS

BACKGROUND OF INVENTION

1. Field of the Invention

The field of this invention relates to a global resource sharing of logically linked (using if-then-else, case statement, compile embedded, etc.) and integrated functionality for building solutions. More specifically, the present invention relates to means for creating completed solutions based on sharing of page-source code and settings parameters that can be logically linked at the global resource sharing level. Also, there are other means for providing services to a broad base of solutions at the resource sharing level by integrating services to all solutions at the resource, like, foreign language translation, page rendering, securities, etc.

2. Prior Art

It always has been the goal to facilitate the building of complete software solutions by simplifying the approaches used in software development and integration. Since the early days of software development tools and techniques have been devised, created and integrated as part of the software building processes.

One of the first techniques has been the creation of software routines and procedures where code repetition can be integrate at one location and used throughout the software development cycle by calling them without having to repeat the programming effort.

As the software development matured other techniques sufficed as well, like, the Dynamic Linking Library (DLL). With DLL many application solutions can use them, and they are linked to the application solution at runtime as needed.

Lately other software development techniques have been devised as well, like Microsoft .NET technology where any computer language shares the resource where many DLL's are integrated at the resource level and available to any application and any solution at runtime.

Each step in the software development evolution the goal has been to facilitate the development and integration of software logic by having more ready-solved software logic code blocks located at one location, at the resource level.

Although all the prior enhancements addresses a peculiar problem, insofar, none truly integrate all the development at the resource level by having all these ready-solved software logic code blocks that can be logically linked and shared by any application and any solution at the resource level.

It is the object of this invention to offer easy solution means in the development and integration of software application that can be logically linked to any solution thus reducing development cycle by having a resource sharing that applications and solutions can be developed and integrated by having them logically linked without repeating efforts. This invention will allow application and solution development to be located at one global resource location that can be shared over a network or over the Internet as needed.

SUMMARY OF THE INVENTION

It is the object of this invention to demonstrate a global resource sharing of logically linked software code blocks, application pages and application page's settings that can be shared in house over a network or globally over the Internet. It will further have the ability to logically link code block to pages, have these pages grouped into an application then have these applications grouped into a solution without repeating the programming effort. All that will need is to program the required code blocks to integrate the solution under development. As more logically linked code blocks are developed and integrated at the global resource, more applications will be able to use them and have more functionality without any new efforts or expenses.

Also, it will have the ability to share settings parameters, foreign language translation, securities and other future solutions as well at the resource level and at a single global location.

For instance, once a logically linked code block, application page, a settings parameters, interfaces, etc., are developed, their integration to a final solution can be done by simply dragging-and-dropping them to the solution's resource container.

BRIEF DESCRIPTION OF THE DRAWINGS

The accompanying drawings, which are incorporated in the form a part of this specification, illustrate embodiments of the invention and, together with the description, serve to explain the principles of the invention:

FIG. 1 illustrates a resources sharing container for holding logic functionalities, application requirements, solutions and preconfigured enhancements.

FIG. 1a illustrates a further embodiment of the resources sharing container.

FIG. 6 illustrates a table-representing FIG. 5.

FIG. 7 illustrates a three functions for logic-linking logic code block to a page.

FIG. 12 illustrates a resource table for all three applications and the solution (FIGS. 8, 9, 10 and 11).

FIG. 13 illustrates applications "FirstApp", "SecondApp", "ThirdApp" integration to solution "GlobalSol".

FIG. 14 illustrates the database table integrating the applications to the solution of FIG. 13.

FIG. 18 illustrates a database table for the replication of FIG. 17 and FIG. 17a.

FIG. 21 illustrates the resource for application ("FirstApp").

FIG. 22 illustrates the resource for application ("SecondApp").

FIG. 23 illustrates the resource for application ("ThirdApp").

FIG. 24 illustrates the resource for solution ("GlobalSol")

FIG. 25 illustrates node integration to a HTML page.

FIG. 26 illustrates the node integration of FIG. 25 along with the integration of settings-parameter.

FIG. 27 illustrates the displaying process for a menu.

FIG. 28 illustrates the displaying of a drop-down for the menu of FIG. 27

FIG. 29 illustrates a link for launching a solution and it is the choice of the drop-down menu of FIG. 28.

DESCRIPTION OF THE PREFERRED EMBODIMENTS

Figure 2:
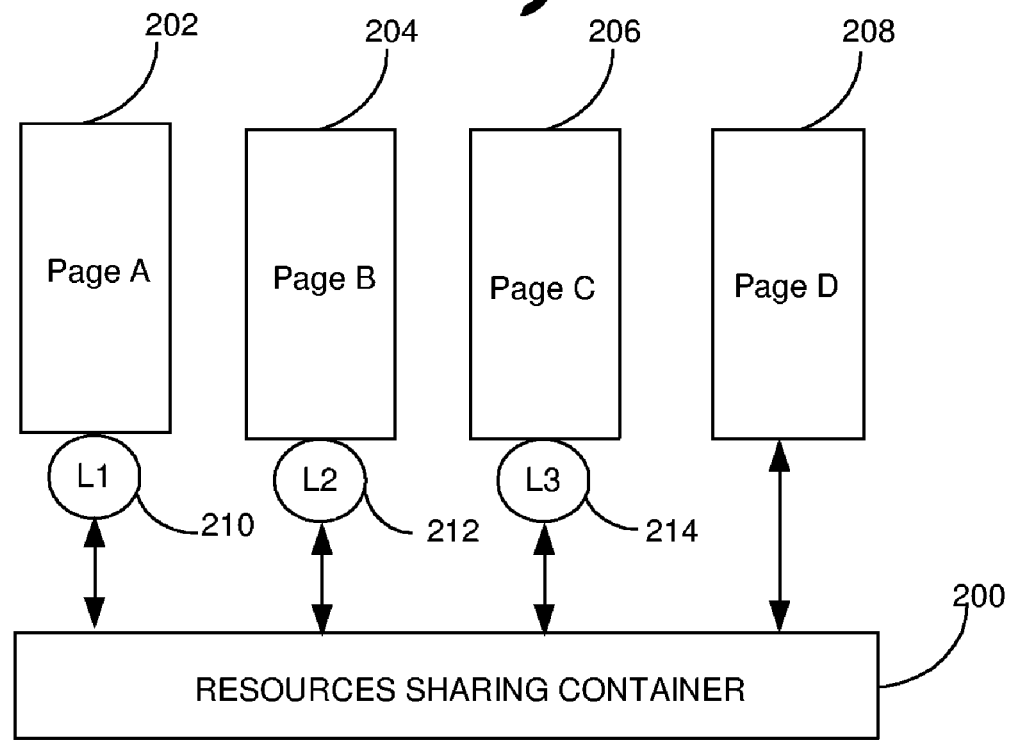
FIG. 2 illustrates a resources sharing container with logic-linking pages.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, software development technique of resources sharing container, or a computer program product. Accordingly, the present invention may take a form of an entirely software embodiment or an embodiment combining software and hardware. Furthermore, the present invention may take the form of a computer program product on a computer-readable storage medium having computer-readable program code means embodied in the medium. Any computer readable medium may be utilized including hard disks, CD-ROMs, optical storage devices, or magnetic devices.

Furthermore, any reference to names of a product or of a company is for the purpose of clarifying our discussion and they are registered to their respective owners.

I) Overview of the Resources Sharing Container.

The resources sharing container contains all the required components for building robust logic-pages, applications and their integration to solutions. The resources sharing container can be programmed, database integrated by the user-supplied data stored in tables or the combination of both.

Once it is programmed or data is stored within, they can be shared by any page, application or solution. Also, changes and upgrades need be applied to the resources sharing container only once without having the redistribution efforts and expenses associated with new software versions.

Also, by having a logically linking mechanism at the resource level, once a solution is integrated it can be virtually replicated by simply registering it to a different user. The user can be a company owner of the solution. The first solution becomes a template-mode for its virtual replication. It is like having a single car that can be driven by the whole family at the same time at different locations and tailored to each individual family-member as per each individual tastes and preferences.

Moreover, the resources sharing container has all of the requirements to integrate program code and other parameters related means to a page. Then the page can be integrated to an application, finally, the application can be integrated to one or more solutions. In other words, the resources sharing container has pieces of program code, settings, interfacing, rendering parameters, etc. It can be located in the database, user supplied files or user input.

Each part of the resources sharing container is like a plug in, but may not be associated to any specific page, application or solution. Therefore, they are loose by making and ready to be plugged in into a page, application or solution as required. The plug in mechanism functions like an electric switch. Except it is a logic switch, switching program code, settings, interfacing, etc., in and out as needed.

Furthermore, the resources sharing container can be compared to an electrical wiring system and all the devices connected thereof. Each device connected to an electrical wring system usually has a switch of some sort, to switch it on and off. At the resources sharing container, the switching is done with the use of program logic.

Lets proceed with the example of the devices connected to the electrical wring system. If these devices were integrated at the resources sharing container, each device could have been of any shape, size, colors, and so on. Lets say that a light bulb is the device that we're talking about. Now, if the light bulb were within the resources sharing container. The light bulb could've been of any size, shape, color, intensity, and so on. Not only that, but the light bulb would've been only one and replicated, reshaped, resized, etc., according to each one needs and preferences.

Lets move on and learn how this process works by turning to FIG. 1, and it illustrates the Resources Sharing Container 100, the Logic Functionalities 110, the Application Requirements 120 and the final Solution 130. Now, Translation and Securities 140; Interfacing, Renderings and Settings 150 are preconfigured enhancements to the resources sharing container. They can be part of the resources sharing container (be embedded to the resources sharing container's pages, applications and solutions), like translations and securities, or, they can be user supplied, like settings, interfacing and renderings. In the case of translations and securities, all solutions will use them and they are integrated at the resource level. All others are user supplied and will differ for each solutions. Many other enhancements can be created and integrated as well.

As we progress, it will become clear how each one interacts within the resources sharing container. The logic functionalities 110 contain all the code-logic, program code, logic-linking nodes, applications and solutions setting, translations, securities, etc., and they have the logic-linking mechanism for their integration to any page, application of solution. The Application Requirements 120 are the user defined needs for the integration of pages to applications, and the integration of applications to solutions. The Solution 130 is the final user-defined solution and it is the byproduct of Logic Functionalities 110, and Application Requirements 120.

Turning to FIG. 1a, and it is a further embodiment of FIG. 1. FIG. 1a shows Preconfigured Enhancements 160 and they are linked/available to Pages 164 through Logic Links 162. As we will see in the following examples, some preconfigured enhancements are embedded to the resources sharing container, others are user supplied and only available to the user's application. Lets continue. Pages 164 are linked to Applications 168 through Logic Links 166, and Applications 168 are linked to Solutions 172 through Logic Links 170.

As it is with any software solution, it is programmed as components and later integrated (linked) to code-pages at machine runtime. The two most popular are DLL (dynamic linking library) and the latest Microsoft .NET. They both are linked at runtime. DLL's are integrated at the operating system level and are registered with the operating system and they can be shared by any application, that is, they are dynamically linked to applications at runtime. The .NET shares some similarities with its predecessor DLL. It is linked at runtime but it is part of the .NET resource infrastructure that allows the creation of binaries (compiled code that is read by a binary interpreter) and it is language independent.

Unlike DLL's and .NET, logically linked pages, application and solutions are not dynamically linked at runtime. The linking process is done automatically by the resource and it is based on each application requirements. That is the reason it is called logic-linked. As it has been mentioned before, the resource can contain all kind of parameter-based files, database tables, program code block and many other techniques can be developed and used as well, from now on their combinations will be referred as logic-linking components. Once these logic-linking components are integrated at the resources sharing container they are free to be logic-linked to any solution and not being specific to any page, application or solution.

II) Logic-Linking Pages within the Resources Sharing Container.

Lets delve a little further into the logic-linking process and turn to FIG. 2; it illustrates the logic linking of pages that are within the "Resources Sharing Container" 200. "Page A" 202 is linked to the "Resources Sharing Container" 200 by node "L1" 210. The logic linking mechanism can be an "if-then-else", "case blocks" or any other form for integrating code to a page (FIG. 7 illustrates an "if-then-else" method). It can also be integrated as part of the resource itself. The same explanation applies to "Page B" 204 and it has the node "L2" 212 and "Page C" 206 has the node "L3" 214. "Page D" 208 differs from the other pages, it doesn't have any logic-linking node, it is integrated into the resource and it can be used by any application or solution. It can be a page common to all applications and/or solutions like: a login page.

III) Logic-Linking Nodes within a Page.

Figure 3:
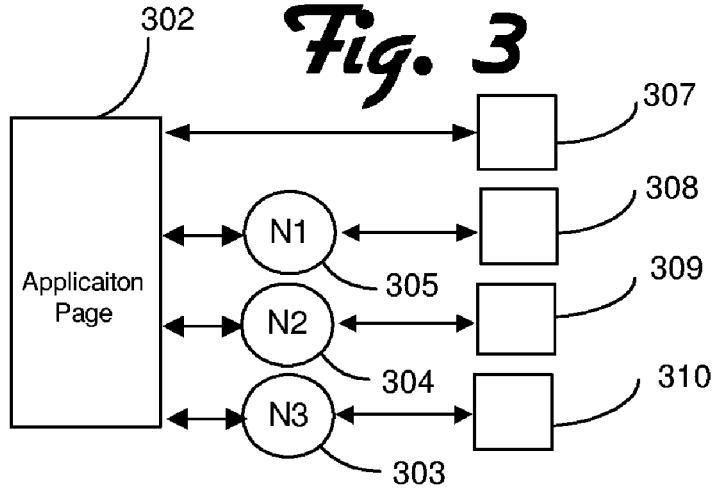
FIG. 3 illustrates a logic-linking page.

FIG. 3 is a further embodiment of FIG. 2 and it illustrates a page with its logic-linking node. As with pages that are linked to applications through logic-linking nodes, pages have logic-linking mechanism as well and they allow the integration of code-logic blocks (piece of program code). As we see "Application Page" 302 has one ready linked code-logic block 307. Node "N1" 305 links code-logic block 308; node "N2" 304 links code-logic block 309 and node "N3" 303 links code-logic block 310. By having code-logic blocks that are logically linked to pages, it allows any common used code block to be integrated in more than one page, thus, reducing code replication and maintenance.

Figure 4:
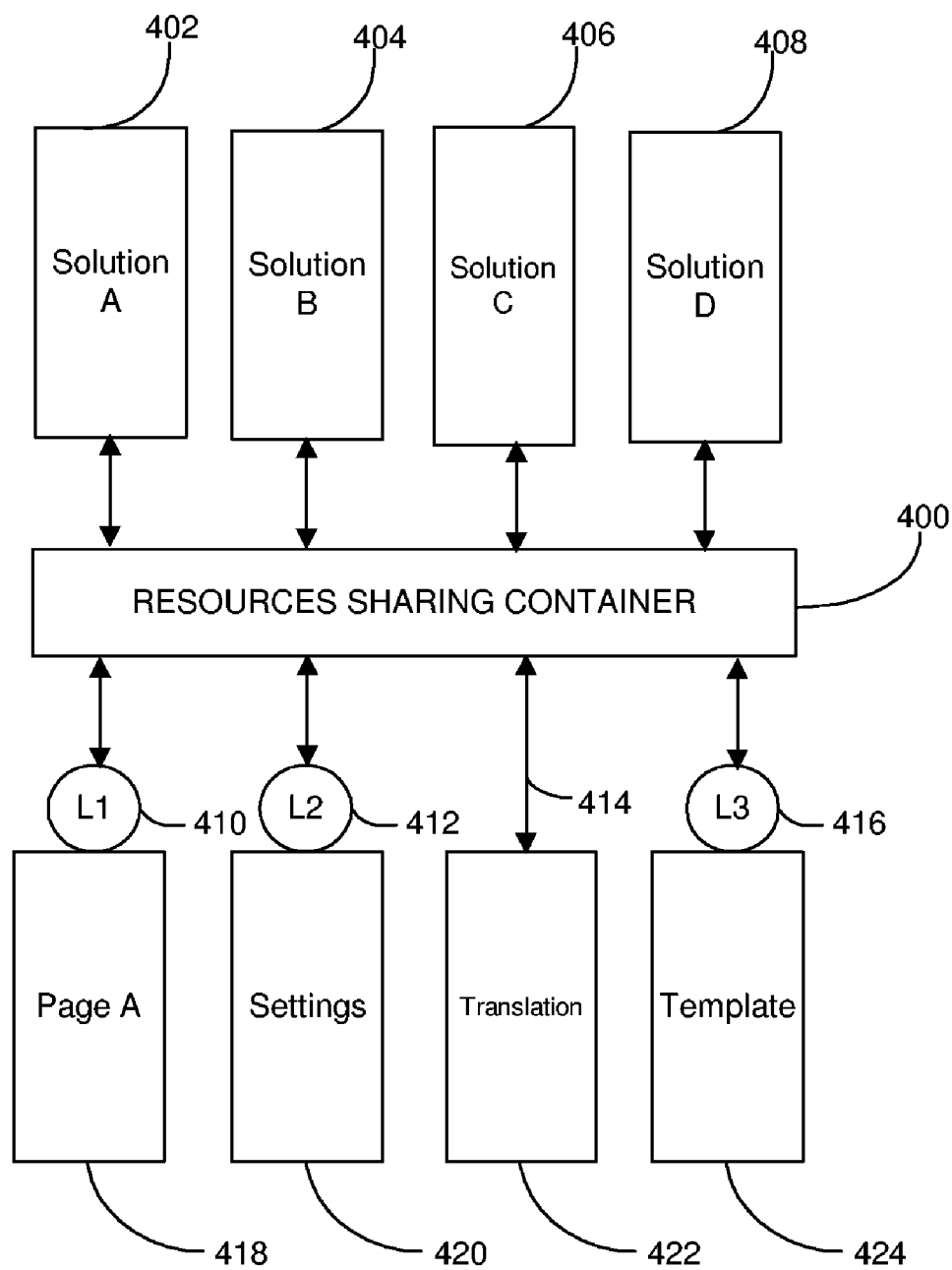
FIG. 4 illustrates a resources sharing container with logic-linking page, settings, translation and template.

Lets proceed by turning to FIG. 4, and it illustrates the Resources sharing container 400 along with logic-linking pages of different functionalities. Lets start from the bottom part of the "Resources Sharing Container" 400. The first page, "Page A" 418 is a program logic-page and it has a logic-linking node "L1" 410; the second page is a page with "Settings" 420 (user supplied) and it has a logic-linking node "L2" 412; the third is a means for "Translation" 422 and it is integrated at the resource level and it is indicated by the "double arrow line" 414; finally, there is a "Template" 424 (user supplied) and it is logic-linked by node "L3" 416.

The "Settings" 420 and "Template" 424 are both user supplied. Both of them will be integrated to the user's specific solutions and not having any effect to any other solutions therewith.

IV) The Sharing of the Resources Sharing Container by Solutions.

Continuing with FIG. 4. Now lets review the solutions that are above the Resources Sharing Container 400. There are four solutions, lets just review the first one, "Solution A" 402, and it has a "double-arrow", which indicates that it is already logic-linked, since it has already been explained at FIG. 2. The logic-link is not shown in this Figure. It is done as is for sake of simplicity and not intended to obscure this invention.

"Page A" 418 is linked through logic-link "L1" 410 and it can be used, logically linked, by any of the above solutions. "Settings" 420 shows logic-link "L2" 412 and "Template" 424 shows logic-link "L3" 416. These two are logically linked to their respective user's solutions and not necessarily linked to the Resources Sharing Container, although they can be linked to Resources Sharing Container as well. "Translation" 422 is linked (integrated/embedded) to the Resources Sharing Container and shown by the "arrow" 414. Translation is available to all solutions.

The purpose of this Figure arrangement is to illustrate that more than one solution can be integrated by having the same pages logically linked to any one of them in any arrangement. The explanation for the other solutions (Solution B 404, Solution C 406 and Solution D 408) are as for the above one, and anyone skilled in the art will be able to follow its explanation and understand the other ones as well.

V) A Database Table Representing the Resources Sharing Container.

Figure 5:
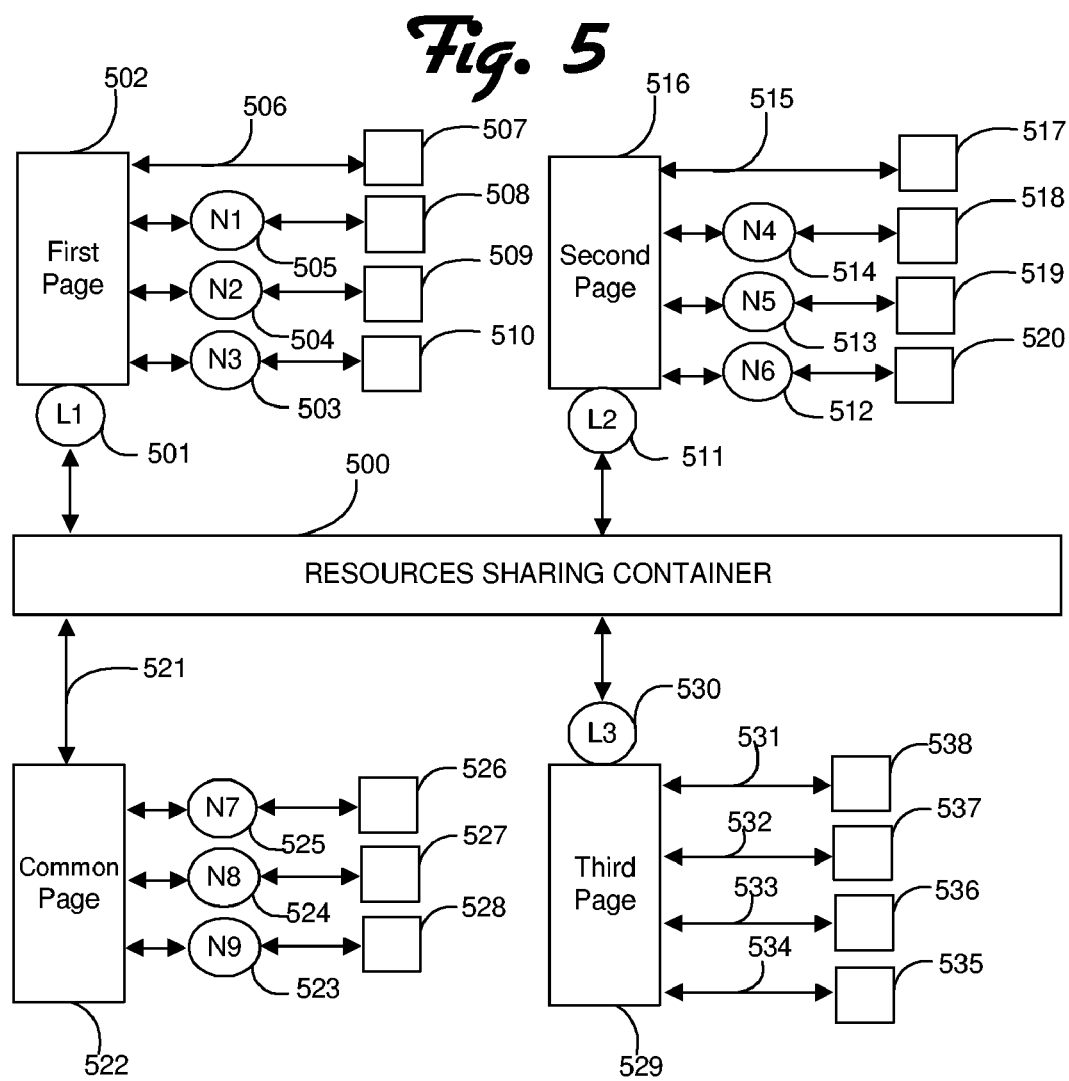
FIG. 5 illustrates a resources sharing container with logic-linking pages and logic-linking logic code blocks.

As we turn to FIG. 5, it illustrates what has already been explained. The Resources Sharing Container 500 along with four pages. Lets move to FIG. 6 and it is a database table of the resources share container and it represents FIG. 5 embodiment. As we review FIG. 6, FIG. 5 will be fully explained as well.

Lets proceed with FIG. 6 and explain the first two rows of the resources sharing container's database table 600. The first row #1 (ID column) at the "Page_Link" column we see the value of "L1", and it is the logic-link node "L1" 501 of "First Page" 502 of FIG. 5. Next column is the "CodeBlock_Link" column and it has the value of "DL_L1__1", and it represents the two-arrow link 506 of FIG. 5. The value "DL_L1__1" of column "CodeBlock_Link" deserves special attention. Any time a value at this column has the starting value of "DL" it means that the logic code block is directly linked to the page or application, in this case it is part of the page, it can be any other value as well. The last column, "Location" has "C:/resources/dl_l1__1.inc" and it is the folder location where the logic code block 507 of FIG. 5 is located. The second row #2 (ID column) at the "Page_Link" column we see the value of "L1", and it is the logic-link node "L1" 501 of First Page 502 of FIG. 5. Next column is the "CodeBlock_Link" column and it has the value of "N1", and it represents the "N1" 505 of FIG. 5. The last column, "Location" has "C:/resources/n1.inc" and it is the folder location where the logic code block 508 of FIG. 5 is located. The last three rows of the database table show the value of "CP" for the "Page_Link" column, and it is the abbreviation for "Common Page" 522 of FIG. 5. All other rows in the database table are self-explanatory and anyone skilled in the art will be able to follow the above explanation along with what has already been explained so far and fully understand their meanings.

VI) A Logic-Linking Method in a Page.

FIG. 7 illustrates how to implement the logic-linking mechanism that has been discussed so far. It uses a "function firstPage( )" and it can be called from any page, and once called its "if-then-else" will include the code based in the application requirements selected by the user. The code can be in the form of DLL, include file, objects from database, etc.

As it has been explained before, other methods can be used as well for the same purpose, like case statements, logic part of the resources sharing container, or a compiler can be developed for the same purpose and be used to compile the code for each application and solution as they are fetched for the first time by the computer.

Continuing with FIG. 7, lets review the first "if" statement of the function "firstPage( )" and it is "if(getResources ("N1"))". As the function's code is processed the function "getResources(sParm)" will be called and the parameter of "N1" will be passed on to the function "getResources( )", and it will in turn call "checkResources( )" function and pass the "N1" parameter to it. The "checkResources( )" function will use the received parameter "N1" and compare it to the resource and if the user has selected the node "N1", that is, the node "N1" is part of the user's resources. If it is, the function "checkResources( )" will return "true" to "getResources( )" and "getResources( )" will return "true" to the "firstPage( )" function, thus, finalizing the process, and the code within the "if" statement "if(getResources("N1"))" will be included into the page.

VII) Applications and Solutions Requirements.

Figure 8:
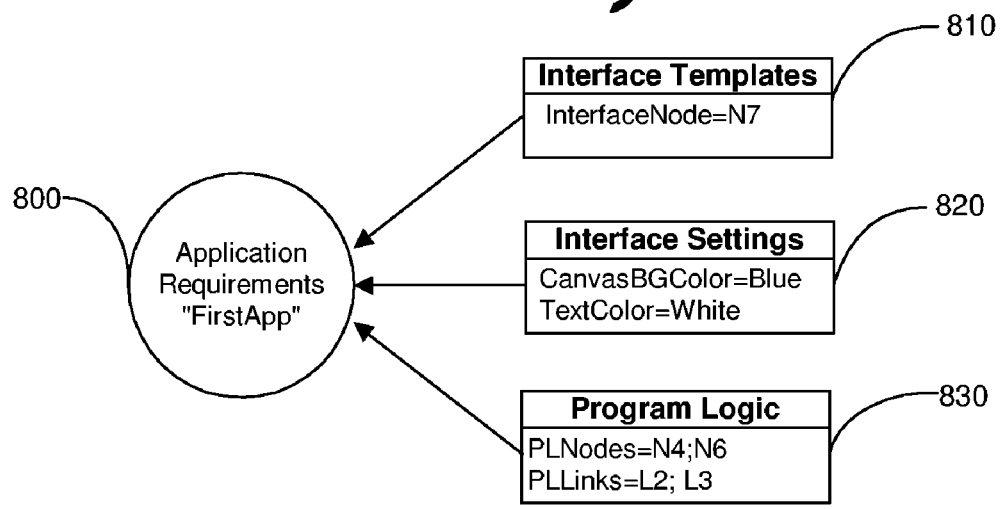
FIG. 8 illustrates the logic integration of an application ("FirstApp").
Figure 9:
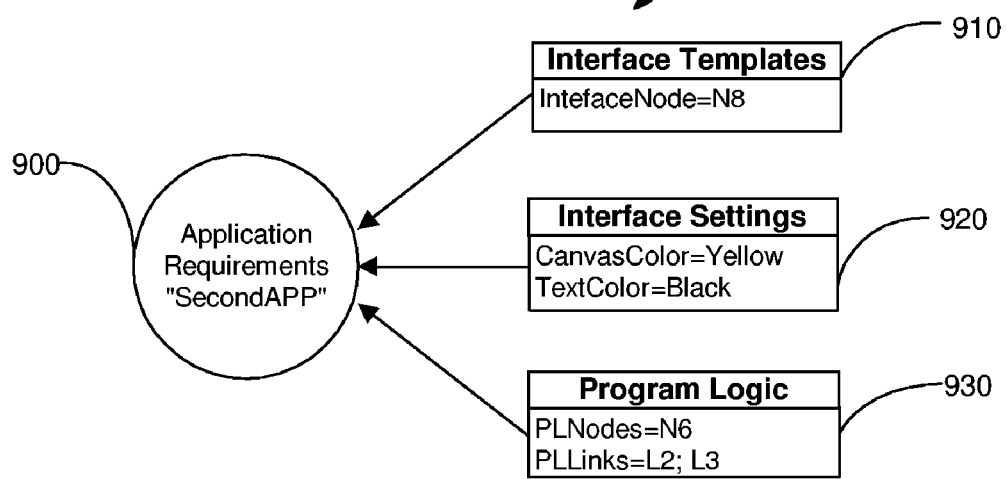
FIG. 9 illustrates the logic integration of an application ("SecondApp").
Figure 10:
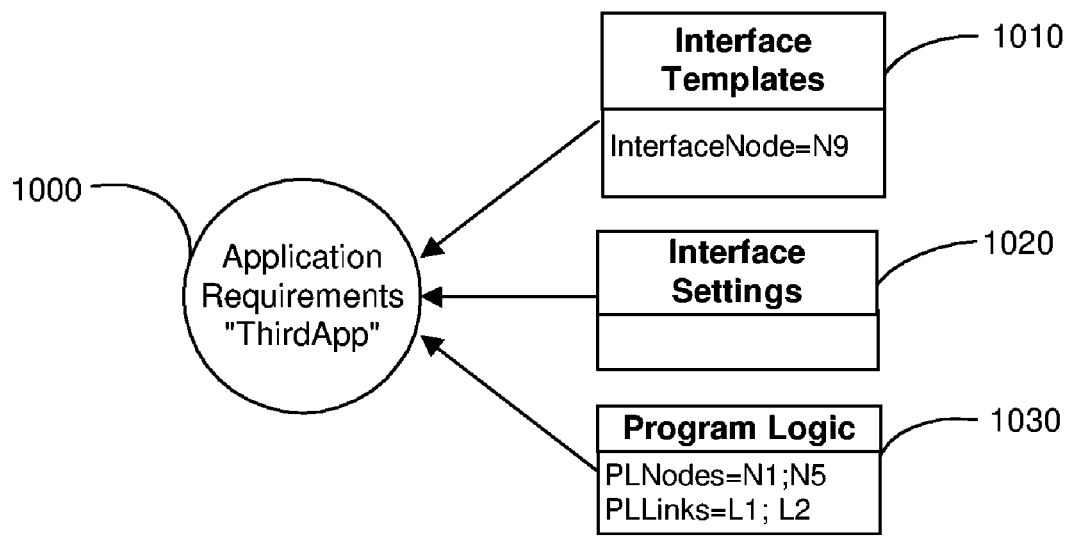
FIG. 10 illustrates the logic integration of an application ("ThirdApp").

FIGS. 8, 9 and 10 illustrate the supplying of Interface Templates, Interface Settings and Program Logic for applications, FIG. 10 shows the same method for a solution.

We'll be using FIG. 5 and FIG. 8. Starting with FIG. 8, and it illustrates the Application Requirements "FirstApp" 800 and it has "InterfaceNode=N7" for Interface Templates 810, and, it is the node "N7" 525 FIG. 5 logically linked to Common Page 522 FIG. 5. Next the Interface Settings 820 have "CanvasBGColor=Blue" and "TextColor=White" and they are interface rendering. They can user supplied by uploading a file, or they can be integrated to the resources sharing container from a database table. Its use will fully explained as we review FIG. 26. Following is the Program Logic 830, and it has the "PLNodes=N4;N6" and they are "N4" 514 and "N6" 512 of FIG. 5 logically linked to Second Page 516 FIG. 5; "PLLinks=L2;L3" are "L2" 511 and "L3" 530 of FIG. 5.

Lets review what has been done and turn to FIG. 5. The application that integrates the above resource (FirstApp) now has the value "SecondPage" 516 with code logic block 517, code logic block N4 518 and code logic block N6 520. It also has the "Third Page" 529 and all of its code logic blocks.

The means for supplying these requirements to the resources can be in the form of check boxes, uploaded files, part of the resources sharing container itself or any other user supplied means. Other kind o requirements can be include when needed, as well.

Figure 11:
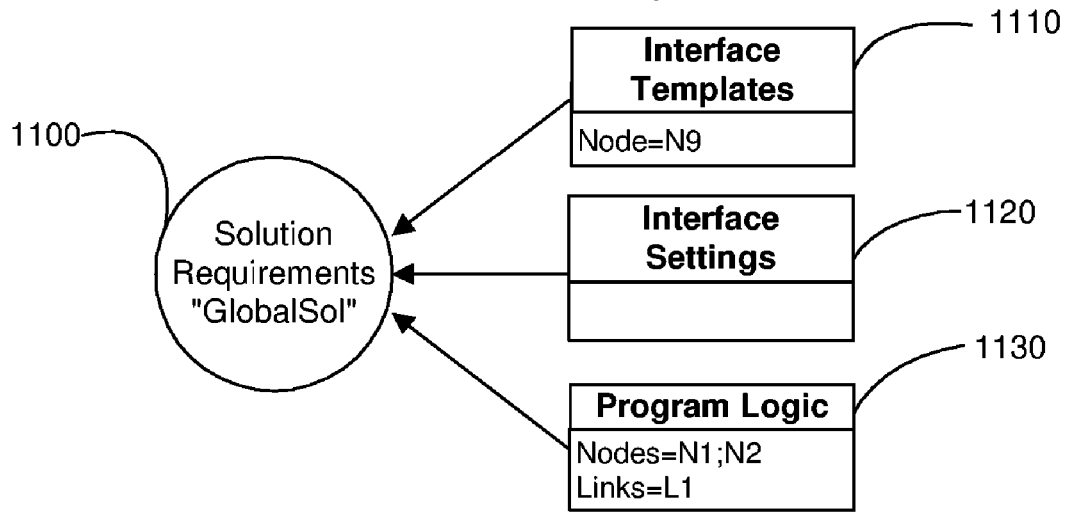
FIG. 11 illustrates the logic integration of a solution ("GlobalSol")

The same explanation applies to FIGS. 9, 10 and 11 and anyone skilled in the art will be able to follow the explanation given for FIG. 8 and fully understand them as well. FIG. 10 and FIG. 11 don't have any value for the Interface Settings 1020 and 1120 respectively. It simply means that the application "ThirdApp" 1000 and the solution "GlobalSol" 1100 didn't require any interface rendering.

Once these application requirements are supplied to the resources sharing container, they can be stored in a database table or any other storing means. Also, the process of supplying requirements can be done with check boxes, pull down menus, drag-and-drop, etc.

We'll be using FIG. 8 and FIG. 12. FIG. 12 illustrates a database table for the applications and solution of FIGS. 8, 9, 10 and 11. Lets proceed and review the database table's column "ID" first row#1. Under the column "Application_ID" and on ID row #1 we see the "FirstApp" and it is "FirstApp" 800 FIG. 8. Next column "Interfacing" and under row #1 we see "N7" and it the "InterfaceNode=N7" of Interface Template 810, FIG. 8. Next, the column "Settings" and on row #1 we see "CanvasBGColor=Blue; TextColor=White". They are "CanvasBGColor=Blue" and "TextColor=White of Interface Settings" 820, FIG. 8. Finally, the column "Code_Logic" and on row #1 we see the values "PLNodes=N4;N6|PLLinks=L2;L3". They are the "PLNodes=N4;N6" and "PLLinks=L2;L3" of Program Logic 830, FIG. 8.

Row #2 relates to FIG. 9; row #3 relates to FIG. 10 and row #4 relates to FIG. 11. They use the same principle as for the row #1 and anyone skilled in the art will be able to follow the above explanation and fully understand them as well.

VIII) Linking Applications to Solutions.

Once application requirements are supplied to an application and it has all of its necessary logic requirements for its support then it is ready to be logically integrated to one or more solutions and the receiving solution will be able to launch them as needed. As we turn to FIG. 13, it illustrates a Solution "GlobalSol" 1300 having three logic-integrated application: Application "FirstApp" 1310, Application "SecondApp" 1320 and Application "ThirdApp" 1330. As we move to FIG. 14, it illustrates a database table 1400 with two columns: "Solution_ID" and "Application_ID". They represent what we've discussed for FIG. 13. The column "Solution_ID" indicates "GlobalSol" and it has three applications (FirstApp, SecondApp and ThirdApp) linked to it. Once again, as with the supplying of application requirements, the linking of applications to solutions can be done with check boxes, pull down menus, drag-and-drop, etc.

Figures 15, 16:
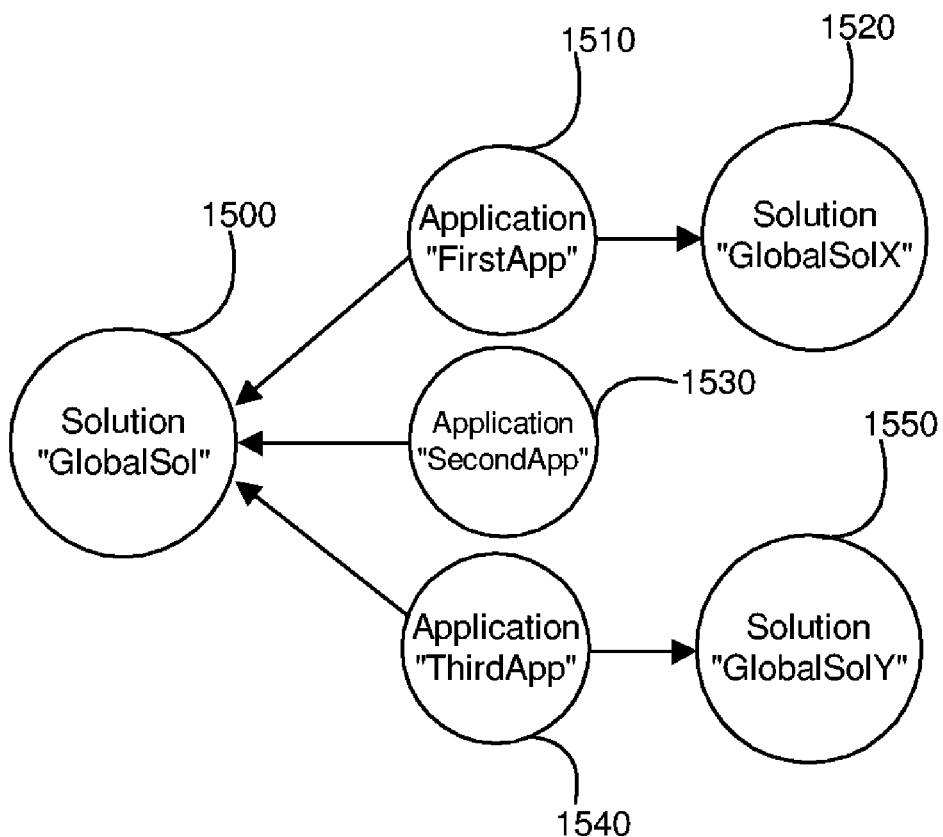
FIG. 15 illustrates the three applications being linked to three solutions.
FIG. 16 illustrates a database table for the three applications linked to the three solutions of FIG. 15.

As we turn to FIG. 15, it is a further embodiment of FIG. 13 and in addition of, it illustrates Applications "FirstApp" 1510 and "ThirdApp" 1540 being integrated to more than one solution. Application "FirstApp" 1510 is integrated to Solution "GlobalSol" 1500 and Solution "GlobalSolX" 1520; Application "ThirdApp" 1540 is integrated to Solution "GlobalSol" 1500 and Solution "GlobalSolY" 1550. Moving on to FIG. 16, it illustrates the data base table 1600 and it is what we've discussed about application integration to more than one solution for FIG. 15.

Lets review the database table 1600 of FIG. 16. The first three rows and at the column "Solution_ID" has "GlobalSol" at each row, the next column, "Application_ID" has the three applications: "FirstApp", "SecondApp" and "ThirdApp" (rows #1-#3). They are FirstApp 1510, SecondApp 1530 and ThirdApp 1540 of FIG. 15. The last two rows are for solutions GlobalSolX 1520 and GlobalSolY 1550. "GlobalSolX" has "FirstApp" (Application_ID column) and it is FirstApp 1510 of FIG. 15. Finally, "GlobalSolY" has "ThirdApp" (Application_ID column) and it is ThirdApp 1540 of FIG. 15.

IX) The Process of Virtual Replication of Solutions.

Once requirements are supplied to an application and the application is logically-integrated to a solution, the solution is ready for the final replication and use by any number of users. This process is much like the replication of software in CD's or any other recording media. The only difference is that, the replicating process is done virtually. Since the application-logic, application requirements, solution and its respective applications reside in the resources sharing container. They can be replicated by just assigning the solution to a user.

Figure 17:
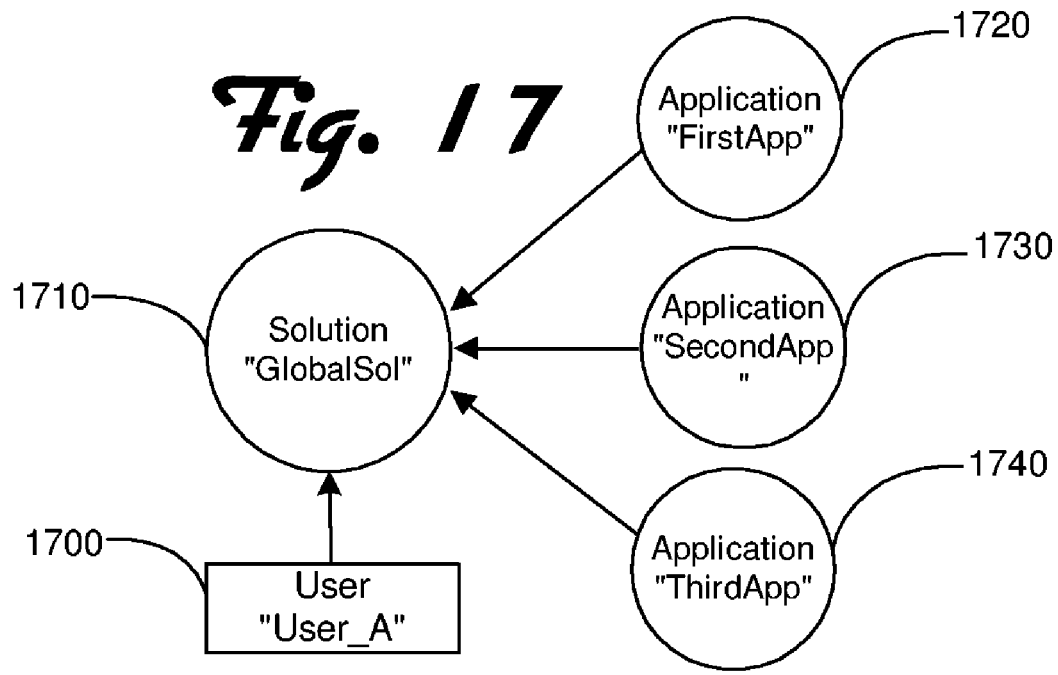
FIG. 17 illustrates a user replicating a solution to a user.
Figure 17A:
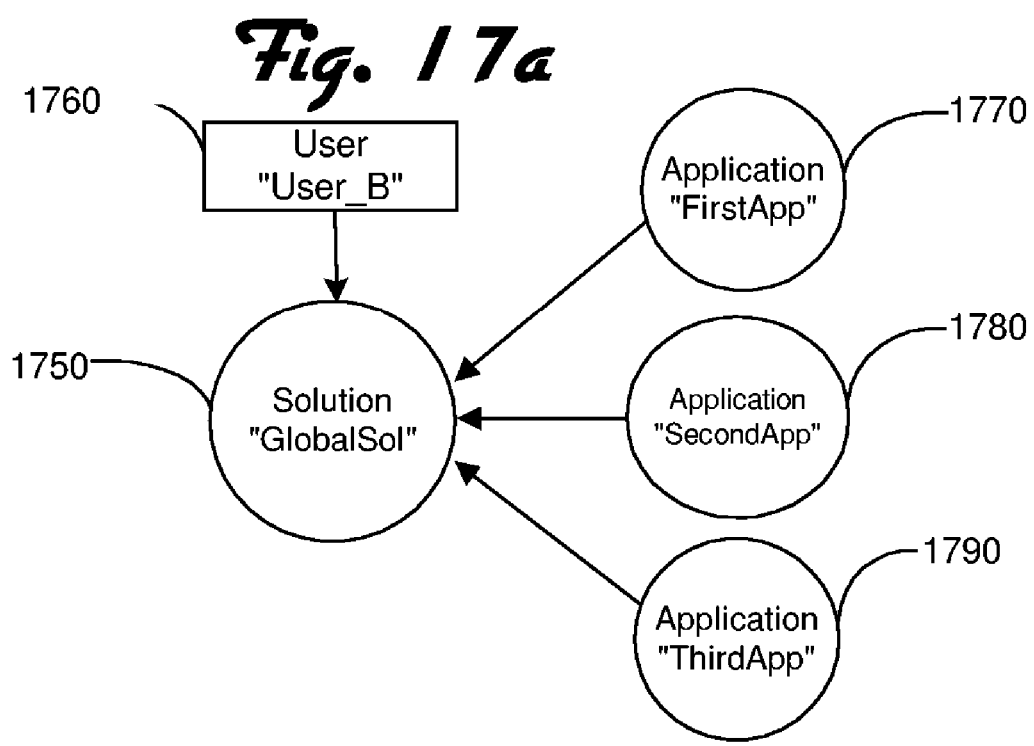
FIG. 17a illustrates a further embodiment of FIG. 17 and a second user replicating the same solution of FIG. 17 to a second user.

As we review FIGS. 17 and 17a. They illustrate the same arrangement of FIG. 13, except, this time the same solution along with its application have been replicated to two users. FIG. 17 illustrates the Solution "GlobalSol" 1710 is assigned to User "User_A" 1700 along with its applications "FirstApp" 1720, "SecondApp" 1730 and "ThirdApp" 1740. FIG. 17a illustrates the Solution "GlobalSol" 1750 is assigned to User "User_B" 1760 along with its applications "FirstApp" 1770, "SecondApp" 1780 and "ThirdApp" 1790.

Lets proceed to FIG. 18, and it illustrates the same table of FIG. 16 with two new column added, the "User_ID" and "Type" columns, and as we examine the "User_ID" column, it illustrates the same solution along with its application assigned to two different users: "User_A" and "User_B" in a virtual replication mode, and they are, "User_A" 1700 of FIG. 17, and, "User_B" 1760 of FIG. 17*a*. Finally, the column "Type" indicates what kind, applications or solutions, the resource identities are. Lets review the first four rows of the database table 1800. The first three rows has the value for "Application" and it is for type "Application" for "FirstApp" 1720; "SecondApp" 1730 and "ThirdApp" 1740 FIG. 17. Row #4 has the value "Solution" and it is for the solution "GlobalSol" 1710 of FIG. 17.

Figures 19, 20:
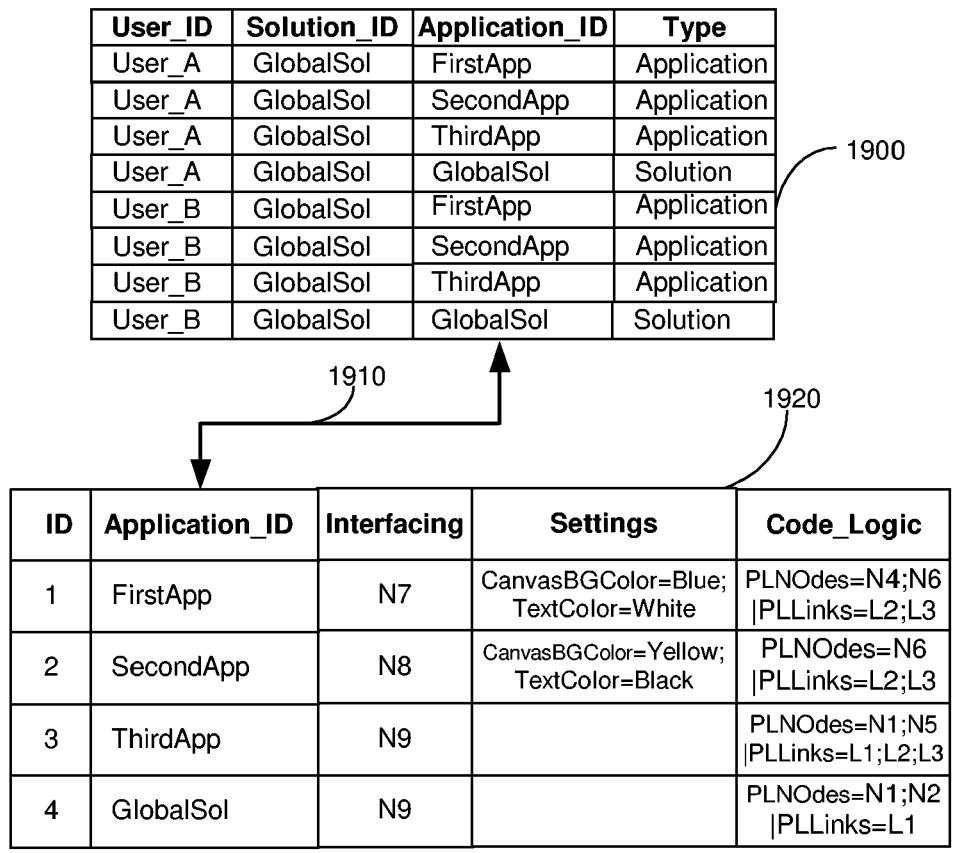
FIG. 19 illustrates two database tables in a relational state and they are FIG. 18 (top) and FIG. 12 (bottom).
FIG. 20 illustrates a database table with pages locations at resource folder.

Proceeding to FIG. 19, two tables are illustrated and they are FIG. 18 and FIG. 12 respectively. Replicated here and showing a database table's relation 1910 by the "Application_ID" column of each table. Lets start with FIG. 19 database table 1900 (top database table) has "User_ID" column and it is the user which has a solution assigned to. Once a user logs in, the resources sharing container will initiate a search for the user at the "User_ID" then retrieve the user's solution based on the "Appliction_ID" of the resources table 1920 (bottom database table). The application and solution resources are retrieved, the resource for each user along with the user's solution is created. This process will be fully explained once we review FIGS. 21-24.

After a user logs in and the solution for the user is loaded and resources are created, they are presented for the user's selection and can be of any form for selecting an application within the user's solution. A linking means will be illustrated later on.

Lets turn to FIG. 19, top table 1900. It has two users illustrated at the "User_ID" column: "User_A" and "User_B". Lets now say that "User_A" is logged in and the applications "FirstApp", "SecondApp", "ThirdApp" and "GlobalSol" are assigned to the logged in user. Since the two tables are related, table 1900 and table 1920. A group of links will be created for "FirstApp", "SecondApp" and "ThirdApp". The "GlobalSol" (forth row) can be programmed to behave differently than the previous three. It can be programmed to load any requirement to be used by the solution, like, loading database tables, settings, interfacing, etc., plus the links for applications "FirstApp", "SecondApp" and "ThirdApp".

Once the user selects any of the application links, lets say that the first link, "FirstApp" is selected. Now lets move to database table 1920 ID #1 (first row) and last column (Code_Logic). At the "Code_Logic" column there is the value of "PLLinks=L2;L3". Now, the program logic will fetch the value "PLLinks=L2;L3" and extract the values "L2" and "L3" then it will formulate a Structured Query Language (SQL) statement (not shown for simplicity) and search the column "PPLink_ID" of database table 2000 of FIG. 20, thus, fetching the rows #2 and #3 of ID column. These two rows have the values "L2" and "L3" at the "PLLink_ID" column respectively. Following these two rows at "SolutionResourcesLocation" column there is the code logic for each page, "C:/resources/second_page.asp" for "L2" and "C:/resources/third_page.asp" for "L3". The previous two logic-links: "L2" and "L3" are the logic-links "L2" 511 and "L3" 530 of FIG. 5.

Lets review this process from the beginning. The user selects the solution link for "GlobalSol" and "FirstApp", "SecondApp" and "ThirdApp" links are displayed. The user selects the link for "FirstApp" and the links for "Second Page" and "Third Page" (SolutionResource_ID database table 2000—FIG. 20) are displayed. The user selects a link, lets assume, the "Second Page" link (second row of database table 2000—FIG. 20). The page "second_page.asp" located at the folder named "resources" at drive "c:" is processed.

Before we move on, lets review the last row of FIG. 20 (PLLink_ID column) database table 2000 and ID #4. It shows the value of "CP". It represents a "Common Page" 522 FIG. 5, and it has already been described and it means that, the page is directly connected to the resources sharing container and available to all applications and solution therein.

The applications and solution we've discussed, can be any commercial solution, like, accounting and the applications can be like, accounts payable, accounts receivable, inventory, etc., and they are part of the solution accounting.

X) The Creation of Resources.

There are two-kind of resources: application resource and solution resource, and they both can be replicated and assigned to a user for the application and the solution holder of the application(s). The replication process takes place at runtime as the resources sharing container retrieves various parameters from storage sources like: database tables, files, and other means as well, it process them and they are used to create the new application and/or solution for the requesting user.

The application resource contains all the necessary information to launch the application and the solution resource contains all the necessary information to launch itself along with all of its applications as well. It is at this time that logic linking takes places and information is loaded from files, also, fetched from database tables.

We'll be using FIG. 19, FIG. 20 and FIG. 21. As we turn to FIG. 21, it illustrates the creation of a resource. Each element of the resource is extracted from a database table that has already been discussed. Lets now focus at resources for the "FirstApp" for the user "Uuser_A" 2120 at the resource 2100. The first and second line "PLNodes=N4;N6" 2102 and "PLLinks=L2;L3" 2104 are retrieved from the first row of the "Code_Logic" column of the database table 1920 of FIG. 19. The third line 2105, "Pages=Second Page|C:/resources/second_page.asp;Third Page|C:/resources/third_page.asp" are retrieved from the database table second and third rows (columns: SolutionResource_ID and SolutionResourcesLocation—database table 2000 of FIG. 20). For each parameter of this line there are two parts (Second Page|C:/resources/second_page.asp). The first one before the "|" is the link's choice (Second Page) and it is used for the end user's selection of the application page, and the application's page is the second part of the link (C:/resources/second_page.asp). The forth line 2106, "InterfaceNode=N7" is retrieved from the "Interfacing" column (first row) of database table 1920 of FIG. 19. The fifth lines 2108, "CanvasBGColor=Blue" and the sixth line 2110, "TextColor=White", are retrieved from the "Settings" column of database table 1920 of FIG. 19 (first row). Finally, the last line 2112, "Type=Application" is retrieved from the "Type" column of database table 1900 of FIG. 19 (first row).

Lets skip FIG. 22 and FIG. 23, since the explanation for FIG. 21, applies to both of them as well. We'll be using FIG. 19 and FIG. 24. Lets turn to FIG. 24, and it illustrates the resource for the solution. It differs from the previous three resources. Lets look at the top of the resource for FIGS. 21-23, there is "APPLICATION_ID" for them, and for the solution resource there is "SOLUTION_ID" 2405. It identifies that the resource is a solution's resource. Now, lets review the fifth and sixth lines of the resource 2400. The fifth line 2410 has, "Type=Solution" and it is retrieved from the "Type" column of database table 1900 of FIG. 19 (forth row), and, the sixth column 2420, has the value: "Applications=FirstApp;SecondApp;ThirdApp" and they are retrieved from the first three rows of the "Application_ID" column of the database table 1900 of FIG. 19. Once the solution resource is loaded into memory and processed, it will display the three applications that are part of it (FirstApp, SecondApp and ThirdApp), and this process is what we've just explained. This covers the creation and replication of solutions along with their replication to users, and anyone skilled in the art will be able to follow the explanations given and fully understand its functionalities.

XI) Rendering a Solution.

We'll be using FIGS. 21-25. Lets turn to FIG. 25, it illustrates the integration of an interfacing logic-node and it is retrieved from the forth line of the resource (see FIG. 21-24). The line of code "<%=getResources("N1")%>" once read by the computer will call a function named "getResources ("N1")"—it is illustrated at FIG. 7, and it has already been explained. The function will read the first line of the resource (FIGS. 21-24—PLNodes) and include the program code that was assigned as part of the application or the solution requirements (PLNodes). In this example, "N1" will integrate (logically link) application 2300 of FIG. 23 (PLNodes=N1;N5) and solution 2400 of FIG. 24 (PLNodes=N1;N2).

FIG. 26 is a further embodiment of FIG. 25 and it illustrates at its first line "<table bgcolor='<%=getSettings("canvasBG-Color")%>'>" another function (not shown for simplicity) that is used to include rendering parameters at a page. As shown, the function "getSettings("canvasBGColor")" will read the fifth line of the resource (FIGS. 21-24) and if one is present, it will fetch its parameter and insert it into the page.

XII) Launching a Solution.

We'll be using FIGS. 27-29 as we explain the process of launching a solution. Once a solution has been created and replicated to a user, all that is needed is the means for launching it to an end user at a client. FIG. 27 illustrates the means for creating and displaying a menu 2700 with three choices: "Choice_A", "Choice_B" and "Choice_C". The first line has the menu-bar dimension, the second line the menu-bar choices, the third line fetches the code "A2" 2710 by executing the line "execute=A2" it uses its code logic 2720 to display the menu.

Lastly, after the menu choices are displayed on the screen and inside the menu-bar, the process for displaying a menu dropdown for one of its choice begins by executing the next line "load=A3" and the code block "A3" is executed 2810 and it has the program code-logic 2820 is used to display the menu dropdown. The menu dropdown 2800 has the choices for the "Choice_A" 2700 (Choice_A{Choice GlobalSolY:GlobalSol;}) and they are two solutions. Lets concentrate in the solution that we've discussed so far, the "GlobalSol". The "GlobalSol" link is shown at FIG. 29 and it contains the "USER_ID" for the solution (USER_ID=User_A) and the solution id for the "User_A" and it is GlobalSol (SOLUTION_ID=GolobalSol).

After an end user at a client access the resources sharing container it will start at a page within a folder assigned to the user's solution. The page will have all the information that is required to launch the user's solution. Once the user's solution is launched it start the process at FIG. 27, and after an end user selects the solutions link (FIG. 29), the client will send the link's information to the server, at the server the resources for the user's application will be created (FIGS. 21-24) and more links for the applications will be displayed, the third line of FIGS. 21-24.

After a link for an application page is selected the page will be launched according to its logic-code requirements, program code-logic will be logically linked and the page will be executed. The complete process has been explained for FIGS. 21-24. Anyone skilled in the art of computer programming will be able to follow the explanations given and fully understand this invention.

Many more arrangements can be created and incorporated in this invention. While it has been fully described in connection with the illustrated embodiments, it will be appreciated and understood that modifications may be made without departing from the true spirit and scope of the invention. We've used examples of code-logic although it can be any other means for linking a program-code component to a page, a page to an application and an application to a solution. Furthermore, this invention will allow the creation of easy of use, low maintenance and virtual replication without the overhead that other currently available solutions require.

What is claimed is:

1. A method enabling sharing of software logic code blocks with an application that may be incorporated into a solution, the method performing, at a server, the steps of:
   registering a plurality of users with the server;
   providing each registered user with a user ID stored on a computer readable medium;
   providing a resource sharing container comprising a plurality of relational database tables including a user resources table, an application resources table, and a solution resources table;
   wherein the user resources table associates each of the user IDs with at least one of a plurality of solution IDs and associates each of the solution IDs with one or more of a plurality of application IDs;
   wherein the application resources table associates each of the application IDs and the solution IDs with a plurality of logic links and logic nodes, wherein each of the logic links identifies a page resource stored in the solution resource table and each of the logic nodes identifies a code block;
   receiving a login request from a first user of the plurality of registered users over a network;
   locating a first user ID of the first user in the user resources table and retrieving the one or more solution IDs corresponding to the first user ID;
   retrieving the one or more application IDs associated with the one or more retrieved solution IDs and virtually replicating an application resource for each of the one or more retrieved application IDs, wherein virtually replicating the application resource comprises:
     accessing the application resources table and retrieving the logic links and logic nodes associated with the retrieved application ID;
     loading one or more page resources from the solution resources table according to a database query formulated from the retrieved logic links; and
     integrating code blocks identified by the retrieved logic nodes into the loaded page resources; and
   executing the integrated page resources and code blocks of the virtually replicated application resource at the server according to input received from the first user to render one or more web pages at the computer operated by the first user.

2. The method of claim 1, further comprising the steps of:
   receiving a selection of a solution ID of the one or more retrieved solution IDs from the first user; and
   displaying an application link for each of the one or more retrieved application IDs at a computer operated by the first user, wherein the virtual replication of the application resource for one of the retrieved application IDs occurs in response to a selection of the application link corresponding to the retrieved application ID.

3. A server computing system configured to share software logic code blocks with an application that may be incorporated into a solution, the server computing system comprising:
a processor;
a memory coupled to the processor, wherein the memory comprises program instructions configured to:
register a plurality of users with the server;
provide each registered user with a user ID stored in the memory;
provide a resource sharing container comprising a plurality of relational database tables including a user resources table, an application resources table, and a solution resources table;
wherein the user resources table associates each of the user IDs with at least one of a plurality of solution IDs and associates each of the solution IDs with one or more of a plurality of application IDs;
wherein the application resources table associates each of the application IDs and the solution IDs with a plurality of logic links and logic nodes, wherein each of the logic links identifies a page resource stored in the solution resource table and each of the logic nodes identifies a code block;
receive a login request from a first user of the plurality of registered users over a network;
locate a first user ID of the first user in the user resources table and retrieving the one or more solution IDs corresponding to the first user ID;
retrieve the one or more application IDs associated with the one or more retrieved solution IDs and virtually replicate an application resource for each of the one or more retrieved application IDs, wherein virtually replicating the application resource comprises:
  accessing the application resources table and retrieving the logic links and logic nodes associated with the retrieved application ID;
  loading one or more page resources from the solution resources table according to a database query formulated from the retrieved logic links; and
  integrating code blocks identified by the retrieved logic nodes into the loaded page resources; and
execute the integrated page resources and code blocks of the virtually replicated application resource at the server according to input received from the first user to render one or more web pages at the computer operated by the first user.

4. The server computing system of claim 3, wherein the program instructions are further configured to:
receive a selection of a solution ID of the one or more retrieved solution IDs from the first user; and
display an application link for each of the one or more retrieved application IDs at a computer operated by the first user, wherein the virtual replication of the application resource for one of the retrieved application IDs occurs in response to a selection of the application link corresponding to the retrieved application ID.

5. A non-transitory computer readable storage medium storing instructions which, when executed by a computer processor, cause the computer to perform the steps of:
registering a plurality of users with the server;
providing each registered user with a user ID stored on a computer readable medium;
providing a resource sharing container comprising a plurality of relational database tables including a user resources table, an application resources table, and a solution resources table;
wherein the user resources table associates each of the user IDs with at least one of a plurality of solution IDs and associates each of the solution IDs with one or more of a plurality of application IDs;
wherein the application resources table associates each of the application IDs and the solution IDs with a plurality of logic links and logic nodes, wherein each of the logic links identifies a page resource stored in the solution resource table and each of the logic nodes identifies a code block;
receiving a login request from a first user of the plurality of registered users over a network;
locating a first user ID of the first user in the user resources table and retrieving the one or more solution IDs corresponding to the first user ID;
retrieving the one or more application IDs associated with the one or more retrieved solution IDs and virtually replicating an application resource for each of the one or more retrieved application IDs, wherein virtually replicating the application resource comprises:
  accessing the application resources table and retrieving the logic links and logic nodes associated with the retrieved application ID;
  loading one or more page resources from the solution resources table according to a database query formulated from the retrieved logic links; and
  integrating code blocks identified by the retrieved logic nodes into the loaded page resources; and
executing the integrated page resources and code blocks of the virtually replicated application resource at the server according to input received from the first user to render one or more web pages at the computer operated by the first user.

6. The non-transitory computer readable storage medium of claim 5, further comprising instructions performing the steps of:
receiving a selection of a solution ID of the one or more retrieved solution IDs from the first user; and
displaying an application link for each of the one or more retrieved application IDs at a computer operated by the first user, wherein the virtual replication of the application resource for one of the retrieved application IDs occurs in response to a selection of the application link corresponding to the retrieved application ID.

* * * * *